(12) United States Patent
Davis et al.

(10) Patent No.: US 11,151,246 B2
(45) Date of Patent: Oct. 19, 2021

(54) RISK SCORE GENERATION WITH DYNAMIC AGGREGATION OF INDICATORS OF COMPROMISE ACROSS MULTIPLE CATEGORIES

(71) Applicant: EMC IP Holding Company LLC, Hopkinton, MA (US)

(72) Inventors: Sashka T. Davis, Vienna, VA (US); Martin Rosa, Quebec (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 309 days.

(21) Appl. No.: 16/242,521

(22) Filed: Jan. 8, 2019

(65) Prior Publication Data

US 2020/0218802 A1 Jul. 9, 2020

(51) Int. Cl.
*G06F 17/18* (2006.01)
*G06F 21/55* (2013.01)
(Continued)

(52) U.S. Cl.
CPC ............ *G06F 21/554* (2013.01); *G06F 17/18* (2013.01); *H04L 9/0643* (2013.01); *H04L 63/1433* (2013.01)

(58) Field of Classification Search
CPC ................................ G06F 21/554; G06F 17/18
See application file for complete search history.

(56) References Cited

U.S. PATENT DOCUMENTS 5,819,226 A 10/1998 Gopinathan et al.
6,064,972 A 5/2000 Jankowitz et al.
(Continued)

FOREIGN PATENT DOCUMENTS

CN 101349987 A 1/2009
JP 2002297543 A 10/2002
(Continued)

OTHER PUBLICATIONS

Dorothy E. Denning, "An Intrusion-Detection Model," IEEE Transactions on Software Engineering, Feb. 1987, pp. 222-232, vol. SE-13, No. 2.
(Continued)

*Primary Examiner* — Peter D Nolan
*Assistant Examiner* — Roy Rhee
(74) *Attorney, Agent, or Firm* — Ryan, Mason & Lewis, LLP

(57) ABSTRACT

A method in an illustrative embodiment comprises receiving a plurality of indicators relating to an entity of a computer network, arranging the indicators in a plurality of categories of increasing risk, assigning weights to the indicators in the categories as a function of the number of categories and the number of indicators in each category, generating a risk score for the indicators based at least in part on the assigned weights, and initiating at least one automated action relating to the entity of the computer network based at least in part on the risk score. The risk score generation is configured such that a weighted contribution to the risk score of indicators in a relatively low one of the categories decreases as a number of indicators in a relatively high one of the categories increases. Similarly, a weighted contribution to the risk score of indicators in a relatively low one of the categories increases as a number of indicators in a relatively high one of the categories decreases.

20 Claims, 6 Drawing Sheets

(51) Int. Cl.
*H04L 9/06* (2006.01)
*H04L 29/06* (2006.01)

(56) References Cited

U.S. PATENT DOCUMENTS

| | | |
|---|---|---|
| 6,505,039 B1 | 1/2003 | Boatwright |
| 7,240,213 B1 | 7/2007 | Ritter |
| 7,908,645 B2 | 3/2011 | Varghese et al. |
| 8,112,546 B2 | 2/2012 | Razmov et al. |
| 8,621,586 B1 | 12/2013 | Peer et al. |
| 8,978,122 B1 | 3/2015 | Zolfonoon et al. |
| 9,015,792 B2 | 4/2015 | Serrano et al. |
| 9,038,134 B1 | 5/2015 | Ackerman et al. |
| 9,049,226 B1 | 6/2015 | Duane |
| 9,800,596 B1 | 10/2017 | Chiles |
| 9,984,344 B2 * | 5/2018 | Singh ................ G06Q 10/0635 |
| 10,003,607 B1 | 6/2018 | Kolman et al. |
| 10,015,185 B1 | 7/2018 | Kolman et al. |
| 2005/0097320 A1 | 5/2005 | Golan et al. |
| 2005/0210056 A1 | 9/2005 | Pomerantz et al. |
| 2006/0272024 A1 | 11/2006 | Huang et al. |
| 2007/0186103 A1 | 8/2007 | Randle et al. |
| 2008/0082380 A1 | 4/2008 | Stephenson |
| 2008/0162338 A1 | 7/2008 | Samuels et al. |
| 2008/0288330 A1 | 11/2008 | Hildebrand et al. |
| 2011/0035444 A1 | 2/2011 | Hill |
| 2013/0133048 A1 | 5/2013 | Wyn-Harris |
| 2014/0230051 A1 | 8/2014 | Vallinayagam et al. |
| 2015/0161394 A1 | 6/2015 | Ferragut et al. |
| 2015/0256550 A1 | 9/2015 | Taylor et al. |
| 2016/0358099 A1 | 12/2016 | Sturlaugson et al. |
| 2017/0324760 A1 * | 11/2017 | Gorny ................ H04L 63/1425 |

FOREIGN PATENT DOCUMENTS

| | | |
|---|---|---|
| JP | 2005301928 A | 10/2005 |
| WO | 2015043491 A1 | 4/2015 |

OTHER PUBLICATIONS

RSA Security Analytics, "Detect & Investigate Threats." Data Sheet, Oct. 2013, 6 pages.

Y. Wang, "A Multinomial Logistic Regression Modeling Approach for Anomaly Intrusion Detection," Computers and Security, Nov. 2005, pp. 662-674, vol. 24, No. 8.

D. Canali et al., "On the Effectiveness of Risk Prediction Based on Users Browsing Behavior," Proceedings of the 9th ACM Symposium on Information, Computer and Communications Security, Jun. 2014, pp. 171-182.

Y. Carlinet et al., "Analysis of Computer Infection Risk Factors Based on Customer Network Usage," Proceedings of the Second International Conference on Emerging Security Information, Systems and Technologies (SECURWARE), Aug. 2008, pp. 317-325, Cap Esterel, France.

* cited by examiner

```
# Assume that multiple categories of IOCs can be active.
# We consider the following categories: Low, Medium, and High. 100 is reserved for Critical
# 0 is reserved for no IOCs
# Average number of IOCs per category; These numbers are subject-matter-expert defined.
NUM_LOW=25
NUM_MED=20
NUM_HIGH=3

# Exponential weights for the individual IOCs in each category (e.g., Low, Medium, and High)
# Powers of 2 are best under certain conditions
# Powers of 10 and 3 could alternatively be used, but may result in skewed distribution of category weights
# Choice is made based on analysts' understanding of the meaning of the categories, signal/noise ratio, etc.
low_value = 1
med_value = 2
high_value = 4 z - is the initial array for the softmax function;
Dimension is the combined expected number of IOCs; and each range is assigned one of the
# values low_value, med_value, high_value based on the numbers:
z=np.empty( NUM_LOW + NUM_MED + NUM_HIGH)
for i in range(0,NUM_LOW):
    z[i]=low_value
for i in range(NUM_LOW, NUM_MED+NUM_LOW,1):
    z[i]=med_value
for i in range(NUM_MED+NUM_LOW , NUM_LOW+NUM_MED + NUM_HIGH):
    z[i] = high_value

# Computing the softmax weights induced by array z
z_exp = [math.exp(i) for i in z]
sum_z_exp = sum(z_exp)
softmax_wt = [round( i / sum_z_exp, 4) for i in z_exp]
```

FIG. 3A

```
# weights - use the softmax_wt weights computed; multiply by 100 (to get to the proper range from 1-> 100)
# round and or smooth.
# No code - manually done in this example:
WEIGHT_L= 0.9
WEIGHT_M = 1.5
WEIGHT_H = 10.3

# Upper/Lower Bounds for different categories of IOCs
# These bounds can be analyst/user defined. we define Low=[1; 39]; Medium=[40;79]1 High=[80;99]
# 0 and 100 are reserved.
LOW_UBND = 39
MED_LBND = 40
MED_HBND = 79
HIGH_LBND = 80
HIGH_HBND = 99

# Exponential decay constant EXP_DEC (also referred to as constant D)
# In some cases, EXP_DEC = 2 - this value works better with WEIGHT_H > 14, but shrinks the WEIGHT_H too fast.
# we use 1.2 in this particular example, based on simulation results
EXP_DEC = 1.2

# Scoring function
# SCORE function
# 1. Allows the Medium IOCs to strengthen the score and spill over the High range.
# 2. Low IOCs are confined to the Low range and do not spill over to the Medium range.
# As a result if Low IOCs are present when Medium or High IOCs are present then
# Low IOCs do not contribute and are ignored.
# magicnumber is the amount by which we reduce the contribution of the Medium IOCs in the case
# when few High IOCs have fired. This is constant R.
# In a more sophisticated implementation the magic number
# is a function and changes for the different ranges.
# For example, if Low IOCs can spill over to Medium IOCs then there may be magicnumber_low
# that alters the contribution of Low IOCs to the Medium range. This magicnumber_low can be different
# than magicnumber_medium of the contribution of the Medium IOCs.
# Can be implemented as a hash table of magicNumbers used for different ranges and types of IOCs.
```

FIG. 3B

```
MAGIC_NUMBER = 3
def compute_score_fm( iocs ):

#CASE 1: High IOCs are present; The presence of low IOCs is irrelevant
    if iocs['h']>0:
        score = float(HIGH_LBND)
        score_m=0 #contribution of Medium IOCs
        score_mixed = 0.0 #mixed score - medium and high -iocs
        add_h = (WEIGHT_H - 1)/EXP_DEC
        for i in range(iocs['h']-1):
            add_h = float(WEIGHT_H)/(EXP_DEC**i)
            score += add_h
        if (iocs['m']>0):
            score_m = round((WEIGHT_M * iocs['m'])/MAGIC_NUMBER)
        else:
            score_m = 0
        #Medium score should never contribute more than the next high increment,
        score_b = float(HIGH_LBND)
        for i in range(iocs['h']):
            add_h = float(WEIGHT_H)/(EXP_DEC**i)
            score_b += add_h
        #Adjusting the mixed score
        score_mixed = round(score + score_m)
        score_b = score_b -1
        if (score_mixed > 98) and (iocs['h'] <= 6):
            score_mixed = 98
        return int(min(99, score_mixed, round(score_b)))
```

FIG. 3C

```
#CASE 2: High IOCs are NOT present and Medium IOCs are present
if iocs['m']>0:
    score = float(MED_LBND)
    if iocs['m']==1:
        return int(score)
    else:
        score = score + WEIGHT_M * iocs['m']
        return int(min(round(score), MED_HBND))

#CASE 3: Neither High nor Medium IOCs are present - only Low IOCs are present
if iocs['l']>0:
    score = 1
    score = WEIGHT_L * iocs['l']
    return int(min (round(score), LOW_UBND))
```

FIG. 3D

RISK SCORE GENERATION WITH DYNAMIC AGGREGATION OF INDICATORS OF COMPROMISE ACROSS MULTIPLE CATEGORIES

FIELD

The field relates generally to computer networks, and more particularly to techniques for providing security in a computer network.

BACKGROUND

Computer networks are often configured to incorporate network security systems in order to protect the networks against malicious activity. Such malicious activity can include, for example, fraudulent access attempts made by human users or possibly by networks of compromised computers or "botnets."

Network security systems can be designed to protect a computer network of a company, organization or other large enterprise comprising many thousands of user devices. However, enterprise computer networks are in many cases continuously growing in size, and often incorporate a diverse array of user devices, including mobile telephones, laptop computers and tablet computers. This continuous growth can make it increasingly difficult to provide a desired level of protection using the limited resources of the network security system. For example, available network security system functionality such as processing of security alerts and deployment of attack remediation measures on user devices can be strained by the demands of large enterprise networks.

SUMMARY

Illustrative embodiments provide techniques for risk score generation utilizing multiple categories for dynamic aggregation of indicators of compromise (IOCs) relating to a file, a machine, a user or another entity of a computer network. For example, some embodiments are configured to dynamically adjust weights assigned to particular IOCs based at least in part on the number of IOCs present in one or more categories. Such IOCs are more generally referred to herein as "indicators" and in some embodiments illustratively comprise respective normalized IOC score values.

The resulting risk scores advantageously provide enhanced insights into aggregated sets of indicators for entities of a computer network and are illustratively utilized to control the triggering of automated actions to improve security in the computer network. For example, such arrangements can facilitate the controlled generation and processing of security alerts in large enterprise computer networks and other types of computer networks and thereby provide increased security against malicious activity.

In an illustrative embodiment, a method comprises receiving a plurality of indicators relating to an entity of a computer network, arranging the indicators in a plurality of categories of increasing risk, assigning weights to the indicators in the categories as a function of the number of categories and the number of indicators in each category, generating a risk score for the indicators based at least in part on the assigned weights, and initiating at least one automated action relating to the entity of the computer network based at least in part on the risk score. The method is performed by at least one processing device comprising a processor coupled to a memory.

The categories in some embodiments comprise at least a subset of low, medium, high and critical categories, although numerous other arrangements of two or more categories can be used in other embodiments.

Each of the categories illustratively accommodates up to a designated maximum number of indicators, with different ones of the categories potentially being configured to accommodate different maximum numbers of indicators.

The weights are assigned to the indicators as a function of the number of categories and the number of indicators in each category in accordance with a designated probability density function in which weights for categories of increasing risk are computed at least in part using exponentials based on respective increasing integers or respective increasing powers of a designated integer. For example, in one possible arrangement of this type with low, medium and high categories, the weights for the low, medium and high categories are computed using respective weighted exponentials of $e^1$, $e^2$ and $e^4$, although numerous other functions and associated weighted values can be used in other embodiments.

Assigning the weights illustratively comprises assigning initial weights to at least a subset of the indicators, and subsequently adjusting the weights. For example, the weights may be adjusted as additional indicators are received and categorized for the entity, or responsive to movement of at least one indicator from one category to another category, possibly based on static or dynamic analysis.

The risk score generation is configured such that a weighted contribution to the risk score of indicators in a relatively low one of the categories decreases as a number of indicators in a relatively high one of the categories increases. Similarly, a weighted contribution to the risk score of indicators in a relatively low one of the categories increases as a number of indicators in a relatively high one of the categories decreases.

Additionally or alternatively, a weighted contribution to the risk score of indicators in a relatively high one of the categories is greater than a weighted contribution to the risk score of indicators in a relatively low one of the categories regardless of the numbers of indicators in the relatively high and relatively low categories.

A given processing device configured with functionality for risk score generation with dynamic aggregation of indicators across multiple categories as disclosed herein may be implemented, for example, in one or more network devices of a computer network, or in a security analytics system or other type of network security system associated with the computer network.

These and other illustrative embodiments disclosed herein include, without limitation, methods, apparatus, networks, systems and computer program products comprising processor-readable storage media.

BRIEF DESCRIPTION OF THE DRAWINGS

FIGS. 3A through 3D show respective portions of a set of pseudocode implementing risk score generation with dynamic aggregation of indicators across multiple categories for a given entity in an illustrative embodiment.

DETAILED DESCRIPTION

Illustrative embodiments will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
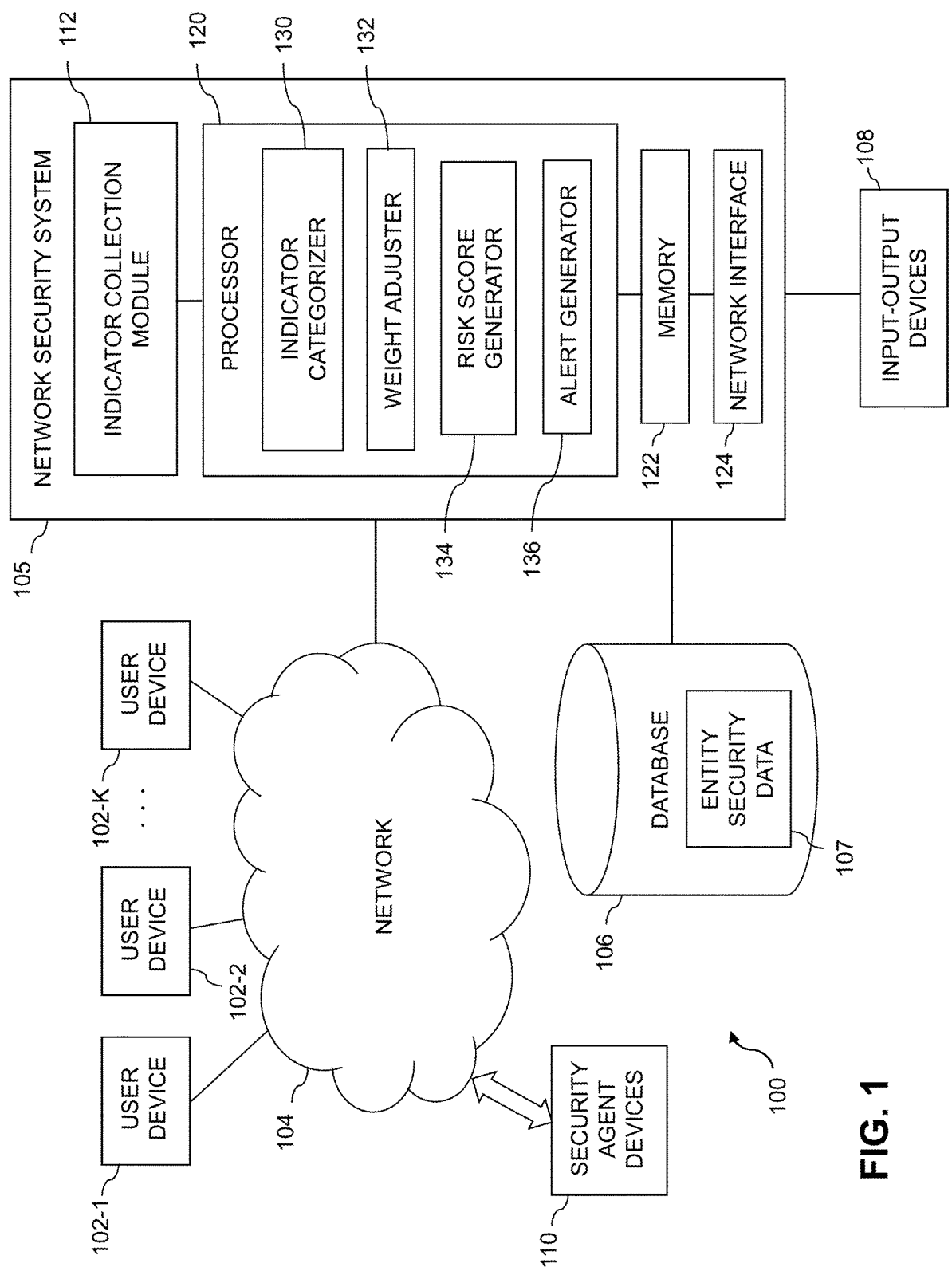
FIG. 1 is a block diagram of a computer network comprising a network security system configured for risk score generation with dynamic aggregation of indicators across multiple categories in an illustrative embodiment.

FIG. 1 shows a computer network 100 configured in accordance with an illustrative embodiment of the invention. The computer network 100 comprises a plurality of user devices 102-1, 102-2, . . . 102-K, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to the network 104 is a network security system 105.

The user devices 102 may comprise, for example, mobile telephones, laptop computers, tablet computers, desktop computers or other types of devices, in any combination, through which various protected resources of the computer network can be accessed, for example, after successful completion of a user login process or other type of user authentication process. Such user devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a WiFi or WiMAX network, or various portions or combinations of these and other types of networks. The computer network 100 in some embodiments therefore comprises combinations of multiple different types of networks each comprising processing devices configured to communicate using IP or other related communication protocols.

The network security system 105 has an associated database 106 configured to store entity security data 107 for each of a plurality of distinct entities of the computer network 100. A given such entity illustratively comprises at least one of a file, a machine and a user of the computer network 100. The term "machine" illustratively refers to one of the user devices 102 or to another type of computer or other processing device of the computer network 100. The term "entity" as used herein is intended to be broadly construed, so as to encompass other elements or components of a computer network, such as a process.

The entity security data 107 in some embodiments illustratively comprises user access data, such as network sessions data, login data or other types of data characterizing user access to protected resources within the computer network 100, as well as various combinations of multiple distinct types of such data. Network sessions data can include, for example, virtual private network (VPN) session data for VPN connections initiated within the computer network 100. Login data can include, for example, authentication data or other types of login data including timestamps and other information associated with login events.

As a more particular example, a successful access attempt is assumed to represent a login event for the corresponding user identifier and is logged in the database 106 as part of the entity security data 107. Other types of authentication mechanisms and associated login events or other user access data can be used in other embodiments.

However, it is to be appreciated that the term "entity security data" as used herein is intended to be broadly construed, and should not be viewed as being limited to the above-noted user access data. For example, other types of entity security data utilized in illustrative embodiments can include security logs collected by a security analytics system implemented in the computer network 100.

The database 106 in the present embodiment is implemented using one or more storage systems associated with the network security system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Examples of particular types of storage products that can be used in implementing a given storage system in an illustrative embodiment include a scale-out all-flash content addressable storage array such as an XtremIO™ storage array from Dell EMC of Hopkinton, Mass. Other types of storage arrays, including by way of example Unity™ all-flash and hybrid flash storage arrays, or VNX® and Symmetrix VMAX® storage arrays, also from Dell EMC, can be used to implement storage systems in other embodiments. Some embodiments additionally or alternatively comprise storage systems implemented at least in part utilizing software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

As indicated previously, the entity security data 107 in some embodiments illustratively comprises respective timestamps and other authentication information characterizing successful logins processed in conjunction with users attempting to access protected resources of the computer network 100 via the user devices 102. Other types of login events, network session events or other access events can be processed in computer network 100 in order to generate entity security data 107.

Also associated with the network security system 105 are input-output devices 108, which illustratively comprise keyboards, displays or other types of input-output devices in any combination. Such input-output devices are used to support one or more user interfaces to the network security system 105, as well as to support communication between the network security system 105 and other related systems and devices not explicitly shown.

In the present embodiment, alerts generated by the network security system 105 are provided over the network 104 to one or more security agent devices 110. Such devices, like the user devices 102, can illustratively comprise mobile telephones, laptop computers, tablet computers, desktop computers, or other types of computers or processing devices configured for communication over network 104 with the network security system 105. For example, a given security agent device can comprise a mobile telephone equipped with a mobile application configured to receive alerts from the network security system 105 and to provide an interface for a security agent to select particular remedial measures for responding to the alert. Examples of such remedial measures may include logging off the user device in question, or requiring various additional authentication factors for subsequent access attempts made from the user device in question.

It should be noted that a "security agent" as the term is generally used herein may comprise, for example, an automated entity, such as a hardware, software or firmware entity running on a processing device. Accordingly, like the above-noted "user," a security agent may but need not comprise a human entity.

The network security system 105 in the FIG. 1 embodiment is assumed to be implemented using at least one processing device. Each such processing device generally comprises at least one processor and an associated memory, and implements one or more functional modules for controlling certain features of the network security system 105.

More particularly, the network security system 105 in this embodiment comprises a processor 120 coupled to a memory 122 and a network interface 124.

The processor 120 illustratively comprises a microprocessor, a microcontroller, a central processing unit (CPU), an application-specific integrated circuit (ASIC), a field-programmable gate array (FPGA), a graphics processing unit (GPU) or other type of processing circuitry, as well as portions or combinations of such circuitry elements.

The memory 122 illustratively comprises random access memory (RAM), read-only memory (ROM), flash memory or other types of memory, in any combination. The memory 122 and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the network security system 105 to communicate over the network 104 with the user devices 102 and the security agent devices 110, and illustratively comprises one or more conventional transceivers.

The processor 120 further comprises an indicator categorizer 130, a weight adjuster 132, a risk score generator 134 and an alert generator 136.

In operation, the indicator collection module 112 collects indicators relating to entities of the computer network 100. For example, indicators may be collected for each of a plurality of entities, where a given one of the entities comprises at least one of a file, a machine and a user of the computer network 100. Such indicators illustratively comprise respective IOCs, such as respective normalized IOC score values.

As a more particular example, IOC score values represented using 10 bits and therefore having a range of values between 0 and $2^{10}=1024$ can be normalized to fall within a range of 0 to 100 instead of the range of 0 to 1024. Such an arrangement uses particular designated bits for different categories of IOC score values, such as bits 1-3 for 7 low indicators, bits 4-7 for 15 medium indicators, and bits 8-10 for 7 high indicators, with an additional bit combination used for a single critical indicator. A wide variety of other normalized IOC score values or other types and arrangements of IOCs or indicators can be used. The term "indicator" as used herein is intended to be broadly construed, so as to encompass a wide variety of different scores, values or other types of signals that may be processed in a network security system or other processing platform of a computer network.

The indicator categorizer 130 of processor 120 receives from the indicator collection module 112 a plurality of indicators relating to a particular entity of the computer network 100, and arranges the indicators in a plurality of categories of increasing risk. For example, the categories of increasing risk illustratively comprise at least a subset of low, medium, high and critical categories, such as the particular categories associated with the above-described normalized IOC score values. The categories are illustratively configured to accommodate up to respective maximum numbers of indicators, with different ones of the categories potentially being configured to accommodate different maximum numbers of indicators, as in the example previously described.

The weight adjuster 132 assigns weights to the indicators in the categories as a function of the number of categories and the number of indicators in each category. For example, in some embodiments, the weights assigned to the indicators in the categories are dynamically adjusted based at least in part on the number of indicators present in one or more of the categories. As a more particular example, the weights may be assigned in accordance with a designated probability density function in which weights for categories of increasing risk are computed at least in part using exponentials based on respective increasing integers or respective increasing powers of a designated integer.

In one possible arrangement of this type with low, medium and high categories, the weights for the low, medium and high categories are computed using respective weighted exponentials of $e^1$, $e^2$ and $e^4$, although numerous other functions and associated weighted values can be used in other embodiments.

Assigning the weights illustratively comprises assigning initial weights to at least a subset of the indicators, and subsequently adjusting the weights. For example, the weights may be adjusted as additional indicators are received and categorized for the entity, or responsive to movement of at least one indicator from one category to another category, possibly based on static or dynamic analysis.

The risk score generator 134 generates a risk score for the indicators based at least in part on the assigned weights.

In some embodiments, the risk score generation is configured such that a weighted contribution to the risk score of indicators in a relatively low one of the categories decreases as a number of indicators in a relatively high one of the categories increases. Similarly, a weighted contribution to the risk score of indicators in a relatively low one of the categories increases as a number of indicators in a relatively high one of the categories decreases.

Additionally or alternatively, a weighted contribution to the risk score of indicators in a relatively high one of the categories is greater than a weighted contribution to the risk score of indicators in a relatively low one of the categories regardless of the numbers of indicators in the relatively high and relatively low categories.

A wide variety of other types of risk scores can be generated in other embodiments, and the term "risk score" as used herein is intended to be broadly construed.

The network security system 105 is further configured to initiate at least one automated action relating to the entity of the computer network 100 based at least in part on the risk score generated in the risk score generator 134 of processor 120.

For example, a given such automated action relating to the entity of the computer network 100 illustratively comprises generating an alert in the alert generator 136 responsive to a result of comparing the risk score to at least one designated threshold, and transmitting the generated alert to a security agent of the computer network 100. The latter portion of this example automated action illustratively involves transmitting a given generated alert from the network security system 105 via the network interface 124 over the network 104 to at least one of the security agent devices 110. In other embodiments, multiple alerts of different types can be generated based at least in part on the risk score.

Additional examples of at least one automated action relating to the entity of the computer network 100 illustratively comprise one or more of whitelisting, blacklisting or greylisting a file, quarantining at least one of a file and an associated machine containing the file, computing a cryptographic hash of a file for use in scanning of one or more machines, scanning one or more machines using a cryptographic hash of a file, and disconnecting one or more machines from the computer network 100.

Still other types of automated actions that may be initiated by the network security system 105 based at least in part on the risk score include performing at least one of static analysis of a file and dynamic analysis of a file.

In some embodiments, the automated action relating to the entity of the computer network 100 comprises moving at least one of the indicators from one of the categories to another one of the categories based at least in part on a result of a security analysis of the entity. The weights assigned to the indicators are then adjusted responsive to the moving of the one or more indicators between categories.

One or more of the above-noted example automated actions are illustratively initiated based at least in part on the risk score, and in some embodiments are more particularly initiated responsive to the risk score exceeding a designated threshold.

The risk scores generated by the network security system 105 in illustrative embodiments advantageously provide enhanced insights into aggregated sets of indicators for entities of computer network 100 and are illustratively utilized to control the triggering of automated actions to improve security in the computer network 100. For example, such arrangements can facilitate the controlled generation and processing of security alerts in large enterprise computer networks and other types of computer networks and thereby provide increased security against malicious activity.

Additional details regarding the operation of computer network 100 in generating risk scores through dynamic aggregation of indicators across multiple categories will be described below in conjunction with FIG. 2.

It is to be appreciated that this particular arrangement of modules 130, 132, 134 and 136 illustrated in the processor 120 of the FIG. 1 embodiment is presented by way of example only, and alternative arrangements can be used in other embodiments. For example, the functionality associated with the modules 130, 132, 134 and 136 in other embodiments can be combined into a single module, or separated across a larger number of modules. As another example, multiple distinct processors can be used to implement different ones of the modules 130, 132, 134 and 136 or portions thereof. The functionality of the indicator collection module 112 of the network security system 105 can similarly be combined with one or more other modules into a single module, separated across a larger number of modules, or implemented using multiple distinct processors.

At least portions of the indicator categorizer 130, weight adjuster 132, risk score generator 134 and alert generator 136 of the processor 120 may be implemented at least in part in the form of software that is stored in memory 122 and executed by processor 120. Similarly, at least portions of the indicator collection module 112 of the network security system 105 can be implemented at least in part in the form of software that is stored in memory 122 and executed by processor 120.

It is to be understood that the particular set of elements shown in FIG. 1 for risk score generation utilizing dynamic aggregation of indicators across multiple categories in computer network 100 and for initiating automated actions based at least in part on the generated risk scores is presented by way of illustrative example only, and in other embodiments additional or alternative elements may be used. Thus, another embodiment may include additional or alternative systems, devices and other network entities, as well as different arrangements of modules and other components.

By way of example, in other embodiments, the network security system 105 can be eliminated and associated elements such as indicator collection module 112, indicator categorizer 130, weight adjuster 132, risk score generator 134 and alert generator 136 can be implemented elsewhere in the computer network 100.

Although not explicitly shown in the figure, an authentication server may be incorporated into or otherwise associated with the network security system 105 in some embodiments. Login events initiated at respective ones of the user devices 102 are directed to the authentication server over the network 104 for processing. The authentication server determines if a given access attempt is authentic based on presentation of one or more predetermined authentication factors such as user identifiers, passwords or other factors. Upon verification of the presented authentication factors, the authentication server grants the requesting one of the user devices 102 access to one or more protected resources of the computer network 100. A given such authentication server in other embodiments can be implemented at least in part externally to the network security system 105, for example, as a stand-alone server, set of servers or other type of authentication system coupled to the network 104.

In some embodiments, the network security system 105 is a part of or otherwise associated with another system, such as, for example, a security operations center (SOC) or a critical incident response center (CIRC).

Additionally or alternatively, the network security system 105 can be part of or incorporate an otherwise conventional security analytics system.

For example, other embodiments can implement the network security system 105 and its associated indicator collection module 112 as part of or in conjunction with a security information and event management (SIEM) system, such as the RSA NetWitness® Platform Evolved SIEM, commercially available from RSA Security LLC ("RSA"), part of Dell EMC of Hopkinton, Mass.

Such an SIEM system is also considered another possible example of a "network security system" as that term is broadly used herein. In an embodiment of this type, at least portions of the entity security data 107 stored in the database 106 illustratively comprise security logs collected by the SIEM system.

An exemplary process, possibly implemented at least in part utilizing indicator collection module 112, indicator categorizer 130, weight adjuster 132, risk score generator 134 and alert generator 136 of the network security system 105 in computer network 100, will now be described in more detail with reference to the flow diagram of FIG. 2. It is to be understood that this particular process is only an example, and additional or alternative processes can be performed by a network security system or other processing platform of a computer network in other embodiments.

In this embodiment, the process illustratively comprises steps 200 through 214. As noted above, at least portions of these steps are assumed to be performed at least in part by the indicator collection module 112 of the network security system 105 and by processor 120 utilizing its modules 130, 132, 134 and 136.

In step 200, indicators relating to an entity of a computer network are collected. The collected indicators illustratively comprise respective normalized IOC score values or other types of IOCs. The entity is assumed to comprise at least one of a file, a machine and a user of the computer network.

In step 202, the collected indicators for the entity are arranged into categories of increasing risk. For example, the categories can comprise at least a subset of low, medium, high and critical categories described elsewhere herein. The categories illustratively accommodate up to respective maximum numbers of indicators, and different ones of the categories can be configured to accommodate different maximum numbers of indicators.

In step 204, weights are assigned to the indicators in the categories as a function of the number of categories and the number of indicators in each category. For example, as mentioned previously, the weights are illustratively assigned in accordance with a designated probability density function in which weights for categories of increasing risk are computed at least in part using exponentials based on respective increasing integers or respective increasing powers of a designated integer. In some embodiments, assigning the weights more particularly comprises assigning initial weights to at least a subset of the indicators, and subsequently adjusting one or more of the weights.

In step 206, a risk score is generated for the indicators based at least in part on the assigned weights. The risk score generation is illustratively configured such that a weighted contribution to the risk score of indicators in a relatively low one of the categories decreases as a number of indicators in a relatively high one of the categories increases. Similarly, a weighted contribution to the risk score of indicators in a relatively low one of the categories increases as a number of indicators in a relatively high one of the categories decreases.

Additionally or alternatively, a weighted contribution to the risk score of indicators in a relatively high one of the categories is greater than a weighted contribution to the risk score of indicators in a relatively low one of the categories regardless of the numbers of indicators in the relatively high and relatively low categories.

Figure 2:
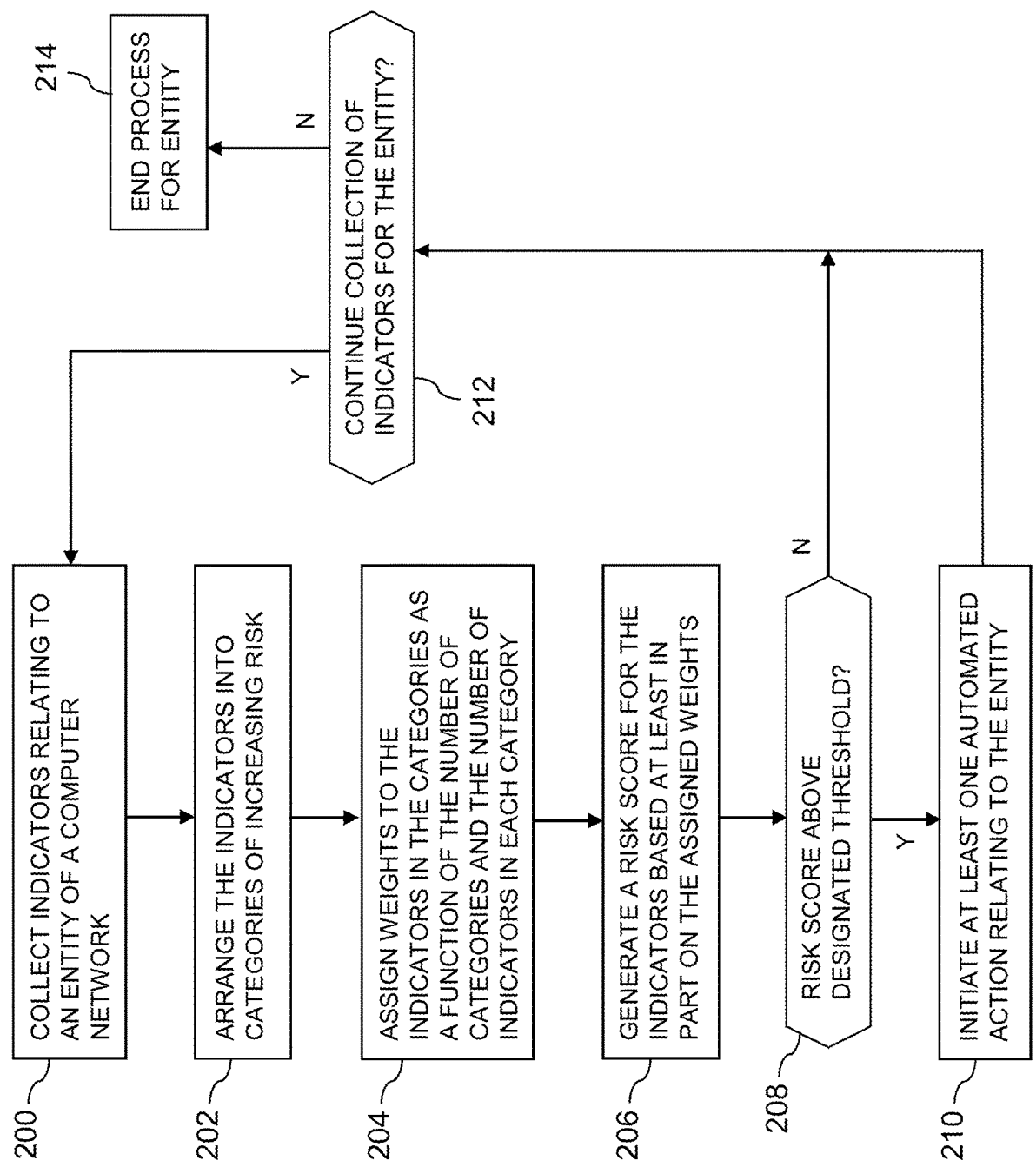
FIG. 2 is a flow diagram of a network security system process that includes risk score generation with dynamic aggregation of indicators across multiple categories for a given entity in an illustrative embodiment.

More detailed examples of the weight assignment in step 204 and the risk score generation in step 206 will be presented following the completion of the general description of the FIG. 2 flow diagram.

In step 208, a determination is made as to whether or not the risk score is above a designated threshold. If the risk score is above the designated threshold, the process moves to step 210 as shown, and otherwise moves to step 212.

In step 210, at least one automated action relating to the entity is initiated. The process then moves to step 212 as indicated. Particular examples of such automated actions are described elsewhere herein.

In step 212, a determination is made as to whether or not the collection of indicators will continue for the entity. If the collection of indicators will continue for the entity, the process returns to step 200 to collect additional indicators for the entity, and otherwise the process ends for the entity in step 214.

It should be noted in this regard that the network security system can be configured to process collected indicators in a real-time processing mode of operation, a batch processing mode of operation, or combinations of real-time processing, batch processing or other types of processing modes.

For example, the aggregation of indicators into a risk score for an entity can be performed over an unbounded time range and/or over one or more bounded time ranges. Performing the aggregation of indicators per entity for a specific bounded time range (e.g., hourly, daily, weekly, etc.) can provide a security analyst with a different view of a potential security problem than that provided using an unbounded time range, and can facilitate the detection of important events that might otherwise go unnoticed.

Additional instances of steps 200 through 214 can be performed for each of a plurality of other entities of a computer network.

Numerous other techniques can be used in association with dynamic aggregation of indicators across multiple categories in illustrative embodiments. For example, alternative processes can initiate other types and arrangements of automated actions in response to a risk score exceeding the designated threshold.

Accordingly, the particular processing operations and other network functionality described in conjunction with the flow diagram of FIG. 2 are presented by way of illustrative example only, and should not be construed as limiting the scope of the invention in any way. Alternative embodiments can use other types of processing operations to dynamically aggregate indicators across multiple categories and to undertake appropriate remediation actions. For example, the ordering of the process steps may be varied in other embodiments, or certain steps may be performed concurrently with one another rather than serially. Also, as indicated previously, multiple instances of the process may be performed for respective different files, machines, users or other entities.

Additional detailed examples of risk score generation with dynamic aggregation of indicators across multiple categories will now be described. These examples can be implemented in accordance with the framework of the FIG. 2 process or as part of numerous other processes involving risk score generation.

In the examples to be described, risk scores are generated in a manner that can ensure that lower importance indicators will never override higher importance indicators, regardless of the number of lower importance indicators. The risk score generation process illustratively utilizes a risk score function that aggregates indicators of potentially different strength, magnitude, and information content. The resulting risk score is advantageously configured to allow a security analyst to interpret its value even when no information is available about the particular indicators used in its generation.

The risk score function in the present examples utilizes a discrete value range, possibly defined by a subject matter expert. More particularly, the risk score function utilizes integers in the range [1, MAX], MAX=100. Although other types of ranges, possibly including continuous and countably infinite [0, +∞) ranges, can be used in other embodiments, these other ranges can create issues due to lack of measurement precision and the presence of varying degrees of noise in the indicators. For example, utilizing a continuous range with multiple digits after the decimal point can produce low accuracy, possibly due to the leading digit being incorrect, and/or low interpretability. The countably infinite range case is also potentially problematic, in that it can be difficult for a security analyst to determine what value (e.g., 100, 1000 or 100000) constitutes a high score.

Accordingly, the above-noted discrete value range, comprising integers in the range [1, MAX], where MAX=100, is utilized in the present examples. The boundaries of the range, namely 0 and MAX, are reserved for special purposes, with the value 0 indicating that no indicator has been received for the entity, and the value MAX=100 being reserved for critical conditions to be described in more detail below.

The particular categories utilized in the present examples are Low, Medium, High and Critical, with each indicator belonging to exactly one of the categories.

The Low category includes indicators that are informational and have potentially the highest noise content.

The Medium category includes indicators that have higher information content than those in the Low category, with respect to the risk measured.

The High category includes indicators with the highest information content with respect to the risk measured.

The Critical category includes indicators providing absolute confidence that an event of interest has happened.

Each category is assigned a non-overlapping subrange for interpretability, as follows:

Low∈[1, LowBound]
Medium∈[LowBound+1, MediumBound]
High∈[MediumBound+1, HighBound].
Critical=MAX As one example of possible bounds of these non-overlapping subranges, LowBound=39, MediumBound=79, HighBound=99, and MAX=100, although other bounds can be used in other embodiments.

The weight assignment of step 204 in the present examples utilizes the softmax function to assign probabilistic weights to each indicator. Let the numbers of indicators in the Low, Medium, and High categories be denoted as L, M, and H respectively. Let $Z=\sum_{i=1}^{L} e^l + \sum_{i=1}^{M} e^m + \sum_{i=1}^{H} e^h$, where l=1, m=2, and h=3. Other types of probability density functions can be used in weight assignment in other embodiments. The use of the softmax function in the present examples should therefore not be viewed as limiting in any way.

In cases involving higher noise levels, higher-order powers can be used in the weight assignment. This can include powers of two, as follows: $l=2^0=1$, $m=2^1=2$, and $h=2^2=4$. For still higher noise levels, powers of three can be used, as follows: $l=3^0=1$, $m=3^1=3$, and $h=3^2=9$.

Indicators that belong to the Low, Medium, and High categories are assigned weights of $$W_L = \frac{MAX \times e^l}{Z}, W_M = \frac{MAX \times e^m}{Z}, \text{ and } W_H = \frac{MAX \times e^h}{Z},$$

respectively.

For example, in one possible configuration, assuming L=40, M=20, and H=5, and utilizing the above-listed powers of two for the initial weights, gives Z=529.5, $W_L$=0.5, $W_M$=1.4, and $W_H$=10.3.

The risk score generation of step 206 in the present examples is configured as follows, for three distinct cases denoted as A, B and C:

A. If only $N_L$ indicators from the Low category are active:

$N_H$=0;$N_M$=0;$N_L$>0 then:

Score=MIN{LowBound,round($W_L \times N_L$)}

B. If the number of Medium indicators is greater than zero, an arbitrary number of Low indicators are active, and zero indicators from the High category are active:

($N_M$>0) and ($N_H$=0) then:

if $N_M$=1 then Score=LowBound+1 else Score=MIN{LowBound+1+round($W_M \times N_M$),MediumBound}

C. If $N_H$>0; the number of indicators in the High category is greater than 0. Assume that $N_L$, $N_M$ are arbitrary. Constants D and R are used in the risk score function in this case, as described below.

Constant D is used for non-linear reduction of the contribution of High indicators as their numbers grow. A suitable value for constant D based on empirical observations is D=1.2, although other values can be used. The effect of constant D on the risk score is captured in Equation (1) below. For example:

if $N_H$=1,Score=61;

if $N_H$=2,Score=71;

if $N_H$=3,Score=80;

if $N_H$=4,Score=87;

if $N_H$=5,Score=93.

Constant R is used in Equation (2) below to reduce the weight contribution of Medium indicators when there are few indicators in the High category. A suitable value for constant R based on empirical observations is R=3.0, although again other values can be used. The total contribution of the indicators from the Medium category towards the final risk score in accordance with Equation (2) is $$\frac{W_M \times N_M}{R} \text{ or } \frac{W_H}{D^W H} - 1,$$

whichever is the smaller of the two. Equation (2) is configured such that the indicators from the Medium category cannot increase the final risk score above what it would have been if the number of High indicators is increased by one. This is done for interpretability and to ensure that the score is monotonically increasing with respect to indicators of the High category.

$$\text{Base} = \textit{MediumBound} + 1 \quad \text{Equation (1)}$$

$$\text{score}_h = \sum_{i=0}^{N_H - 1} \left( \frac{W_H}{D^i} \right)$$

$$\text{score}_m = \begin{cases} \text{MIN}\left\{ \frac{W_H}{D^W H} - 1, \frac{W_M \times N_M}{R} \right\} & \text{if } N_M > 0 \\ 0 & \text{if } N_M = 0 \end{cases} \quad \text{Equation (2)}$$

$$\text{Score} = \text{MIN}(\textit{HighBound}, \text{round}(\text{Base} + \text{score}_h + \text{score}_m))$$

An example set of pseudocode implementing risk score generation utilizing the risk score function described above is shown in FIGS. 3A through 3D. This particular pseudocode and any features, parameters and/or comments referred to therein are presented by way of example only, and should not be construed as limiting in any way. In the pseudocode, the categories include Low, Medium and High, with an additional Critical category being reserved for only the most critical indicators.

The risk score function described above can be generalized in the following manner. In the above description, indicators in the Medium category are permitted to influence or "spill into" the range of the High indicators. However, in other applications it might be desirable to allow spillage from Low to Medium, or from Medium to High, or both. To implement spillage from Low to Medium in the risk score function, the portion of the risk score function for case B above is replaced with the following:

If $(N_H = 0)$ and $(N_M > 0)$ then:     Equation (1')
  if $N_M = 1$
    then Score = $\textit{LowBound} + 1$
  else
    $\textit{BaseL} = \textit{LowBound} + 1$ $$\text{score}_m = \sum_{i=0}^{N_M - 1} \left( \frac{W_M}{(LD)^i} \right)$$

$$\text{score}_l = \begin{cases} \text{MIN}\left\{ \frac{M}{(LD)^M} - 1, \frac{W_L \times N_L}{(RL)} \right\} & \text{if } N_L > 0 \\ 0 & \text{if } N_L = 0 \end{cases} \quad \text{Equation (2')}$$

Score = MIN(*MediumBound*,
    round(*BaseL* + score$_m$ + score$_l$))
    return Score The risk score function in this example uses different constants LD and RD, instead of the constants D and R, respectively. This is done because the weight $W_M$ is different than the weight $W_H$ and so the contribution should be reduced at a different rate. Such an arrangement is also appropriate when the values for LowBound, MediumBound, and HighBound are different, or the number of indicators in each category is different. Assume by way of example that LowBound=30, MediumBound=70, HighBound=99, and MAX=100. Also assume that $N_L$=40, $N_M$=20, and $N_H$=5. For this example configuration, the weights are $W_L$=0.8, $W_M$=2.1, and $W_H$=5.6. Suitable values for the constants are LD=1.05 and RL=6, although other values can be used. Values for these and other constants utilized in a given risk score function of the type disclosed herein can be selected based at least in part on a simulation of the risk score function, in order to ensure that the resulting risk scores are reasonable and interpretable prior to deployment.

In the above-described examples, the weight contribution of indicators in the High category changes as the number of such indicators grows. For example, the gap in contribution to the score between one High indicator and two High indicators is greater than the gap in contribution to the score between two High indicators and three High indicators. The risk score function in some embodiments is configured such that as the number of High indicators grows, the significance of the Medium indicators is reduced in terms of their contribution to the score. However, when the number of High indicators is low then the information gathered from Medium indicators is more significant and is reflected in their contribution to the score. The risk score function in some embodiments is also illustratively configured to ensure that the contribution of the Medium indicators cannot exceed the contribution of High indicators, so as to improve the interpretability of the score.

The weight assignment process utilized in the above-described examples involves assigning each indicator to a category, and utilizing the softmax function to calculate the probabilistic weight each indicator will be assigned, given the number of categories and the number of indicators in each category. Advantageously, such an arrangement is both simple but robust. For example, it is much easier to assign an indicator to one of the categories objectively, as in the above-described examples, than it would be to gather large amounts of data to compute a data-driven score. Moreover, the resulting risk scores in the above-described examples are readily interpretable by a security analyst. The security model implemented by the risk score function is also interpretable.

The above-described examples utilize four categories of increasing risk, namely, Low, Medium, High and Critical, although different arrangements of categories can be used in other embodiments. Various types of indicators are assigned to different ones of the categories, possibly based at least in part on input from subject matter experts.

A number of non-limiting examples of particular types of indicators that may be assigned to particular ones of the categories in illustrative embodiments are listed below. It is to be appreciated that these are only example category assignments, and additional or alternative indicators as well as additional alternative category assignments for the respective indicators, can be used in other embodiments.

Examples of Low indicators include the following:
1. Enumerates processes on local system;
2. Enumerates local resources;
3. Adds firewall rule;
4. Gets hostname;
5. Runs file transfer tool.

Examples of Medium indicators include the following:
1. Office application runs command shell;
2. Mshta writes executable;
3. Performs scripted file transfer;

4. Enumerates domain administrators;
5. Enumerates domain controllers.

Examples of High indicators include the following:
1. Disables UAC remote restrictions;
2. Disables firewall;
3. Enables all office macros;
4. Runs regsvr32 COM scriplets;
5. Powershell injects remote process.

Examples of Critical indicators include the following:
1. Enables cleartext credential storage;
2. Exports sensitive registry hive;
3. Possible mimikatz activity;
4. Enables login bypass;
5. Possible RDP session hijacking.

Again, these are only illustrative examples of indicators and their respective category assignments, and should not be viewed as limiting in any way.

As mentioned previously, risk scores generated using dynamic aggregation of indicators across multiple categories as disclosed herein can be used to control the performance of a wide variety of different automated actions in a computer network.

For example, the computer network can be configured to perform particular automated actions responsive to a given risk score exceeding a designated threshold, such as quarantining a file, scanning other machines for the presence of a file, performing static analysis (e.g., reverse engineering and matching of code), and/or performing dynamic analysis (e.g., in a sandbox environment).

Other examples of automated actions include using results of static analysis and/or dynamic analysis to promote one or more indicators from a lower category to a higher category, to demote one or more indicators from a higher category to a lower category, or to remove one or more indicators altogether. Such decisions can be based at least in part on statistics gathered for multiple entities of the computer network over time.

As more particular examples specifically for an entity comprising a file, at least a subset of the following automated actions can be performed based at least in part on a magnitude of the risk score computed for the file:
1. Automatically whitelist, blacklist or greylist the file;
2. Compute a cryptographic hash (e.g., an MD5 or SHA256 hash) or a fuzzy hash (e.g., an SSDEEP hash) of the file and add it to one or more central repositories of hashes for use in automatic scanning of machines;
3. Quarantine the file and/or the machine on which the file was found;
4. Scan machines (e.g., a subset of machines that are servers of special status, tier 2 networks, etc.) for presence of files with a specific cryptographic hash or fuzzy hash;
5. Disconnect one or more machines, subnets or an entire network;
6. Send the file for automatic dynamic analysis in a sandbox environment or to be automatically reverse-engineered and analyzed.
7. Utilize results of analysis to adjust the indicators and the categories to which they belong (e.g., updating the Low, Medium, High and Critical categories by upgrading and downgrading the status of indicators).
8. Maintain statistics for accuracy of various indicators and adjust their respective assignments to the categories.

Although the above examples of automated actions are illustratively defined for an entity comprising a file, similar actions can be performed for other types of computer network entities, such as machines and/or users.

In other embodiments, alternative arrangements can be used to implement risk score generation with dynamic aggregation of indicators across multiple categories.

For example, although the number of categories in the examples above is four, other embodiments can utilize more or fewer categories, with the categories possibly being defined based at least in part on semantic content and particular use cases. Also, the subranges of each category can be altered.

The initial weights assigned to different indicators can be varied depending on the semantics of the categories or other factors, and do not have to be powers of small primes, although powers of 1, 2 or 3 are most frequently used in a softmax function.

Although the softmax function is used for weight assignment in the above-described examples, other types of probability density functions can be used.

It should therefore be apparent that the particular risk score generation techniques described above are exemplary only, and numerous alternative arrangements can be used in other embodiments.

Accordingly, as indicated previously, the various characteristics of these embodiments are intended to be illustrative only and should not be construed as limiting in any way.

The above-described illustrative embodiments provide significant advantages relative to conventional approaches.

For example, some embodiments are configured to provide techniques for risk score generation utilizing multiple categories for dynamic aggregation of IOCs or other types of indicators relating to a file, a machine, a user or another entity of a computer network.

These techniques in illustrative embodiments involve dynamically adjusting weights assigned to particular indicators based at least in part on the number of indicators present in one or more categories.

The risk scores generated in illustrative embodiments advantageously provide enhanced insights into aggregated sets of indicators for entities of a computer network and are illustratively utilized to control the triggering of automated actions to improve security in the computer network. For example, such arrangements can facilitate the controlled generation and processing of security alerts in large enterprise computer networks and other types of computer networks and thereby provide increased security against malicious activity.

Risk scores generated in the manner disclosed herein facilitate provision of security functionality for potentially vast numbers of distinct entities, including files, machines and users, in a wide variety of different security applications and use cases. Multiple indicators with varying degrees of severity are aggregated into a unique risk score for a given entity. The risk scores are highly interpretable and can utilized by security analysts to accurately and efficiently triage, rank and/or prioritize handling of security alerts. The aggregation of indicators into a risk score for the given entity can be performed over both unbounded and bounded time ranges, providing multiple views of potential security issues and allowing detection of important events that might otherwise go unnoticed.

Illustrative embodiments overcome significant disadvantages of unbounded risk scores and data-driven risk scores. For example, in some embodiments, it is not possible for the combined weight of a relatively large number of indicators of low strength to exceed the combined weight of a relatively small number of indicators of much greater strength. As a result, interpretability of the risk scores is significantly enhanced relative to conventional arrangements. Moreover, the cost, complexity and potential inaccuracy of the large-scale data collection process typically used to generate data-driven risk scores is avoided.

The disclosed arrangements therefore provide enhanced security against attacks in enterprise computer networks. For example, the risk scores generated in illustrative embodiments can facilitate detect an attack at an early stage of penetration before an attacker can cause further damage from within an internal network of an enterprise.

It is to be appreciated that the particular advantages described above and elsewhere herein are associated with particular illustrative embodiments and need not be present in other embodiments. Also, the particular types of computer network features and functionality as illustrated in the drawings and described above are exemplary only, and numerous other arrangements may be used in other embodiments.

It was noted above that portions of a computer network as disclosed herein may be implemented using one or more processing platforms. Illustrative embodiments of such platforms will now be described in greater detail. These and other processing platforms may be used to implement at least portions of other computer networks in other embodiments. A given such processing platform comprises at least one processing device comprising a processor coupled to a memory.

One illustrative embodiment of a processing platform that may be used to implement at least a portion of a computer network comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the computer network.

These and other types of cloud infrastructure can be used to provide what is also referred to herein as a multi-tenant environment. One or more platform components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of Linux container (LXC) implemented using a kernel control group. The containers may run on virtual machines in a multi-tenant environment, although other arrangements are possible. The containers may be utilized to implement a variety of different types of functionality within the computer network 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of a computer network comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, a CPU, an ASIC, an FPGA, a GPU or other type of processing circuitry, as well as portions or combinations of such circuitry elements. The memory may comprise RAM, ROM, flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in a computer network as disclosed herein. Such components can communicate with other elements of the computer network over any type of network or other communication media.

As indicated previously, components of a computer network as disclosed herein can be implemented at least in part in the form of one or more software programs stored in memory and executed by a processor of a processing device. For example, at least portions of the functionality of modules 112, 130, 132, 134 and 136 of the network security system 105 are illustratively implemented in the form of software running on one or more processing devices.

It should again be emphasized that the above-described embodiments are presented for purposes of illustration only. Many variations and other alternative embodiments may be used. For example, although described in the context of particular computer network and processing device configurations, the techniques for dynamic aggregation of indicators across multiple categories as disclosed herein are applicable to a wide variety of other types of computer networks and processing device configurations. Also, different types and arrangements of network security systems, modules, indicators, categories, functions, risk scores, thresholds, automated actions and other components and parameters can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. A method comprising:
receiving a plurality of indicators relating to an entity of a computer network;
arranging the indicators in a plurality of categories of increasing risk;
assigning weights to the indicators in the categories as a function of a number of categories and a number of indicators in each category;
generating a risk score for the indicators based at least in part on the assigned weights, wherein generating the risk score comprises iteratively applying a reduction factor to a particular one of the assigned weights for a corresponding one of the categories as a function of the number of indicators in the corresponding category, the iterative application of the reduction factor to the particular assigned weight effectively reducing the incremental contribution of the number of indicators in the corresponding category to the risk score as the number of indicators increases; and
initiating at least one automated action relating to the entity of the computer network based at least in part on the risk score;
wherein the method is performed by at least one processing device comprising a processor coupled to a memory.

2. The method of claim 1 wherein the entity comprises at least one of a file, a machine and a user of the computer network.

3. The method of claim 1 wherein the categories comprise at least a subset of low, medium, high and critical categories.

4. The method of claim 1 wherein the categories accommodate up to respective maximum numbers of indicators.

5. The method of claim 4 wherein different ones of the categories are configured to accommodate different maximum numbers of indicators.

6. The method of claim 1 wherein the weights are assigned in accordance with a designated probability density function in which weights for categories of increasing risk are computed at least in part using exponentials based on respective increasing integers or respective increasing powers of a designated integer.

7. The method of claim 1 wherein assigning the weights comprises:
assigning initial weights to at least a subset of the indicators; and
subsequently adjusting one or more of the weights.

8. The method of claim 1 wherein a weighted contribution to the risk score of indicators in a relatively low one of the categories decreases as a number of indicators in a relatively high one of the categories increases.

9. The method of claim 1 wherein a weighted contribution to the risk score of indicators in a relatively low one of the categories increases as a number of indicators in a relatively high one of the categories decreases.

10. The method of claim 1 wherein a weighted contribution to the risk score of indicators in a relatively high one of the categories is greater than a weighted contribution to the risk score of indicators in a relatively low one of the categories regardless of the numbers of indicators in the relatively high and relatively low categories.

11. The method of claim 1 wherein said at least one automated action relating to the entity of the computer network comprises:
generating an alert responsive to a result of comparing the risk score to at least one designated threshold; and
transmitting the alert to a security agent of the computer network.

12. The method of claim 1 wherein said at least one automated action relating to the entity of the computer network comprises one or more of:
whitelisting, blacklisting or greylisting a file;
quarantining at least one of a file and an associated machine containing the file;
computing a cryptographic hash of a file for use in scanning of one or more machines;
scanning one or more machines using a cryptographic hash of a file; and
disconnecting one or more machines from the computer network.

13. The method of claim 1 wherein said at least one automated action relating to the entity of the computer network comprises performing at least one of static analysis of a file and dynamic analysis of a file.

14. The method of claim 1 wherein said at least one automated action relating to the entity of the computer network comprises:
moving at least one of the indicators from one of the categories to another one of the categories based at least in part on a result of a security analysis of the entity; and
adjusting the weights assigned to the indicators responsive to the moving of the one or more indicators.

15. An apparatus comprising:
at least one processing device comprising a processor coupled to a memory;
said at least one processing device being configured:
to receive a plurality of indicators relating to an entity of a computer network;
to arrange the indicators in a plurality of categories of increasing risk;
to assign weights to the indicators in the categories as a function of a number of categories and a number of indicators in each category;
to generate a risk score for the indicators based at least in part on the assigned weights, wherein generating the risk score comprises iteratively applying a reduction factor to a particular one of the assigned weights for a corresponding one of the categories as a function of the number of indicators in the corresponding category, the iterative application of the reduction factor to the particular assigned weight effectively reducing the incremental contribution of the number of indicators in the corresponding category to the risk score as the number of indicators increases; and to initiate at least one automated action relating to the entity of the computer network based at least in part on the risk score.

16. The apparatus of claim 15 wherein a weighted contribution to the risk score of indicators in a relatively low one of the categories decreases as a number of indicators in a relatively high one of the categories increases, and a weighted contribution to the risk score of indicators in a relatively low one of the categories increases as a number of indicators in a relatively high one of the categories decreases.

17. The apparatus of claim 15 wherein a weighted contribution to the risk score of indicators in a relatively high one of the categories is greater than a weighted contribution to the risk score of indicators in a relatively low one of the categories regardless of the numbers of indicators in the relatively high and relatively low categories.

18. A computer program product comprising a non-transitory processor-readable storage medium having stored therein program code of one or more software programs, wherein the program code when executed by at least one processing device causes said at least one processing device:

to receive a plurality of indicators relating to an entity of a computer network;

to arrange the indicators in a plurality of categories of increasing risk;

to assign weights to the indicators in the categories as a function of a number of categories and a number of indicators in each category;

to generate a risk score for the indicators based at least in part on the assigned weights, wherein generating the risk score comprises iteratively applying a reduction factor to a particular one of the assigned weights for a corresponding one of the categories as a function of the number of indicators in the corresponding category, the iterative application of the reduction factor to the particular assigned weight effectively reducing the incremental contribution of the number of indicators in the corresponding category to the risk score as the number of indicators increases; and to initiate at least one automated action relating to the entity of the computer network based at least in part on the risk score.

19. The computer program product of claim 18 wherein a weighted contribution to the risk score of indicators in a relatively low one of the categories decreases as a number of indicators in a relatively high one of the categories increases, and a weighted contribution to the risk score of indicators in a relatively low one of the categories increases as a number of indicators in a relatively high one of the categories decreases.

20. The computer program product of claim 18 wherein a weighted contribution to the risk score of indicators in a relatively high one of the categories is greater than a weighted contribution to the risk score of indicators in a relatively low one of the categories regardless of the numbers of indicators in the relatively high and relatively low categories.

\* \* \* \* \*